United States Patent [19]
Yamaguchi et al.

[11] Patent Number: 5,172,242
[45] Date of Patent: Dec. 15, 1992

[54] VISUAL PRESENTATION SYSTEM EMPLOYING TWO OR MORE VIDEO DISK PLAYERS FOR PROVIDING AS MANY CORRELATED IMAGES

[75] Inventors: Hirohisa Yamaguchi, Tokyo; Masanori Wakamiya, Kunitachi; Yasuji Morioka, Tokyo, all of Japan

[73] Assignee: TEAC Corporation, Tokyo, Japan

[21] Appl. No.: 681,096

[22] Filed: Apr. 5, 1991

[30] Foreign Application Priority Data

Apr. 9, 1990 [JP] Japan .................................. 2-93566

[51] Int. Cl.⁵ .............................................. H04N 5/76
[52] U.S. Cl. .................................... 358/342; 358/335
[58] Field of Search ............... 358/335, 342, 336, 337, 358/340, 322, 311; 369/30, 34; 360/33.1, 35.1, 14.03, 14.02, 14.01, 13, 12; 395/153, 159

[56] References Cited

U.S. PATENT DOCUMENTS

| | | | |
|---|---|---|---|
| 4,415,938 | 11/1983 | Heitmann | 358/335 |
| 4,616,263 | 10/1986 | Eichelberger | 358/342 |
| 4,766,581 | 8/1988 | Korn et al. | 358/342 |
| 4,805,036 | 2/1989 | Kido et al. | 358/335 |
| 4,805,040 | 2/1989 | Oku et al. | 358/337 |
| 4,823,196 | 4/1989 | Goddard | 358/342 |
| 4,864,402 | 9/1989 | Ebihara et al. | 358/357 |
| 4,888,648 | 12/1989 | Takeuchi et al. | 358/335 |
| 4,894,732 | 1/1990 | Heda | 358/342 |
| 4,905,094 | 2/1990 | Pocock et al. | 358/342 |

*Primary Examiner*—Tommy P. Chin
*Assistant Examiner*—Thai Tran
*Attorney, Agent, or Firm*—Woodcock Washburn Kurtz Mackiewicz & Norris

[57] ABSTRACT

One or more, normally three, cathode ray tube displays are juxtaposed for simultaneous reproduction of correlated pictorial and literal images, either in continuous motion or in still, from two or more video disk players in which prerecorded video disks are to be loaded replaceably. A programmable system controller controls the operations of the disk players in accordance with a predefined program. As one of the disk players sequentially retrieves the prerecorded pictures from the associated video disk, an address detector circuit detects the successive disk tracks from which the pictures are being retrieved. Constantly informed of the current track address on that disk, the system controller causes the other disk player or players to retrieve desired pictures from preselected tracks on the other video disk or disks loaded therein.

8 Claims, 3 Drawing Sheets

| SCENE | FIRST PLAYER | SECOND PLAYER | THIRD PLAYER |
|---|---|---|---|
| I | ADDRESSES 1-200 | ADDRESS 200 | ADDRESS 100 |
| II | ADDRESSES 201-500 | ADDRESSES 201-500 | ADDRESSES 101-400 |
| III | ADDRESSES 501-800 | ADDRESS 200 | ADDRESS 500 |

# VISUAL PRESENTATION SYSTEM EMPLOYING TWO OR MORE VIDEO DISK PLAYERS FOR PROVIDING AS MANY CORRELATED IMAGES

BACKGROUND OF THE INVENTION

Our invention relates to a visual presentation system having at least one, preferably two or more, display devices in combination with at least two video disk players for the provision of correlated visual images for reproduction on the display device or devices. The visual presentation system according to our invention lends itself to use for the commercial publicity of new products and processes, the introduction of corporations and other establishments, the disclosure of scientific and technological theories and ideas, and a variety of other presentations addressed to limited audiences.

Visual presentation systems of the type defined are per se not new in the art. Conventionally, a set of, three for example, displays such as those of the familiar cathode ray tube construction have been connected one to each video tape recorder or deck. Loaded with prerecorded magnetic tapes packaged in, for example, cassette form, the video tape decks have been driven synchronously under the direction of a common electronic control device. The magnetic tapes have correlated video signals prerecorded thereon. Therefore, as the tape decks are driven synchronously, the correlated video signals have been visually reproduced on the displays.

We object to such prior art visual presentation systems for more reasons than one. First, the recording of correlated video signals on the several magnetic tapes has been a very difficult task. It has involved complex editing operations, making the recording task very costly and time consuming. Furthermore, once the recording has been completed, no change in scenario has been possible during the progress of tape reproduction. The slightest change has necessitated the rerecording of the tapes.

SUMMARY OF THE INVENTION

We have hereby invented how to simultaneously reproduce correlated images on two or more displays without the noted inconveniences heretofore encountered in the art.

Briefly, our invention may be summarized as a visual presentation system comprising a first and a second video disk player for use with a first and a second replaceable video disk, respectively. The first video disk has a multiplicity of tracks on which pictures are prerecorded along with addresses identifying the tracks. The second video disk also has a multiplicity of tracks, similar to those on the first video disk, on which pictures correlated with those on the first video disk are prerecorded. An address detector circuit is connected to the first video disk player for deriving from the output therefrom the addresses of the successive tracks on the first video disk from which the pictures are being retrieved by the first video disk player. Also included is a system controller which, inputting the derived track addresses from the address detector circuit, controls the second video disk player for causing the same to retrieve from specified tracks on the second video disk the pictures related to the pictures being retrieved from the first video disk by the first video disk player. The pictures thus retrieved from the first and the second disks are directed into display means for visual reproduction.

Preferably, as in a preferred embodiment of our invention to be set forth subsequently, three cathode ray tube displays may be juxtaposed for joint reproduction of correlated pictorial and literal images from as many video disk players. Only one of each set of video disks, to be replaceably loaded in the three disk players, may have continuous motion pictures information prerecorded thereon in the proper sequence of any desired scenario. The second and third video disks may have prerecorded thereon several alternative pictures, to be reproduced partly in still and partly in motion, that are related to the continuous motion pictures on the first disk.

Thus, as the continuous motion pictures are retrieved sequentially from the successive tracks on the first disk and reproduced on one, normally located centrally, of the three displays, the address detector circuit constantly informs the system controller of the successive tracks on the first disk from which the pictures are being retrieved by the first disk player. Accordingly, in accordance with a predefined presentation program, the system controller may cause the second and the third disk players to selectively retrieve the alternative pictures on the second and the third disks for reproduction on the other two displays. A change in scenario is possible by simple modifications of the presentation program introduced into the system controller.

The above and other features and advantages of our invention and the method of realizing them will become more apparent, and the invention itself will best be understood, from a study of the following description and appended claims, with reference had to the attached drawings showing the preferred embodiment of our invention.

DESCRIPTION OF THE PREFERRED EMBODIMENT

Figure 1:
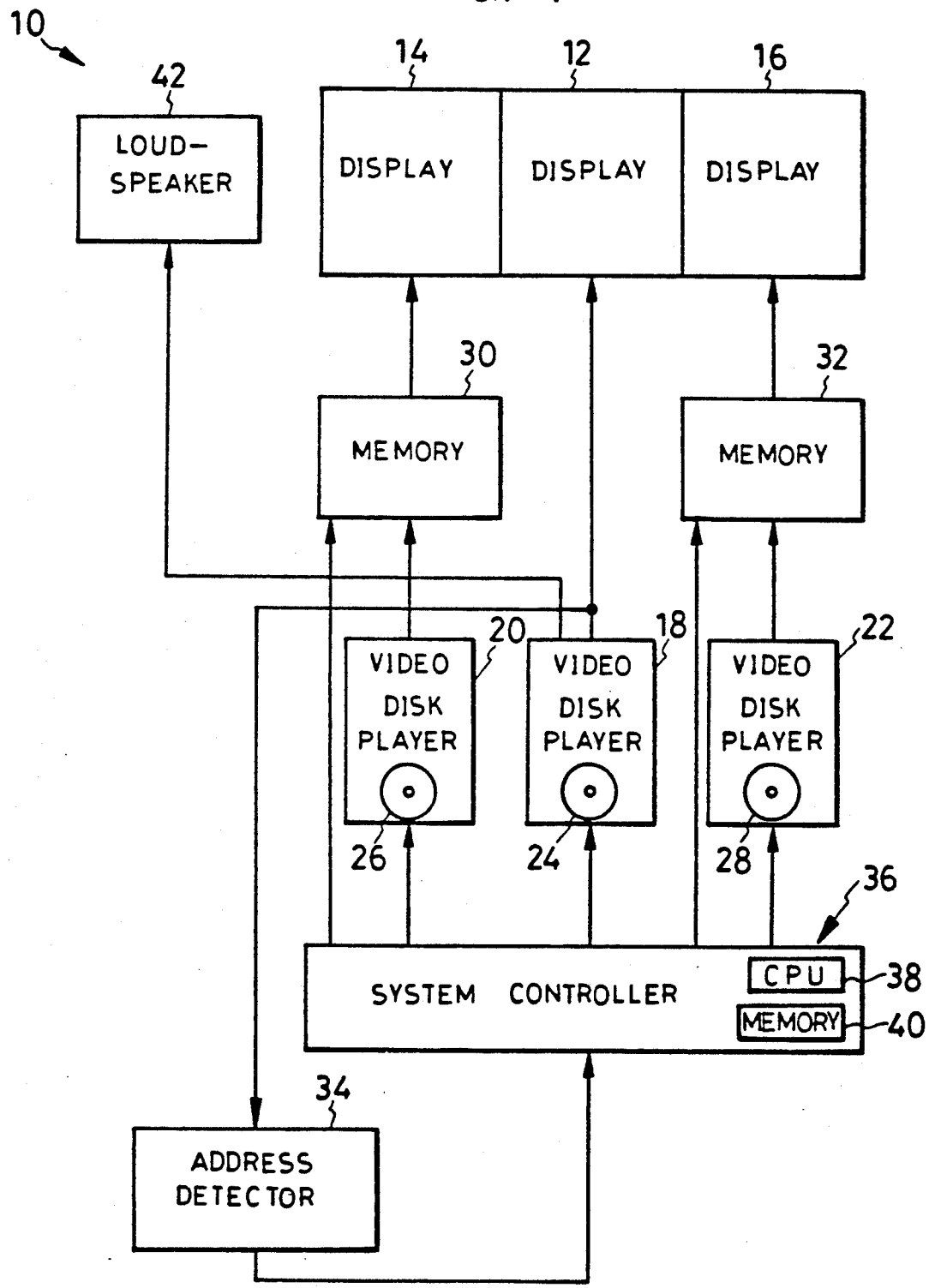
FIG. 1 is a block diagram of a triple display presentation system constructed in accordance with the novel concepts of our invention.

We will now describe our invention in detail as embodied in the triple display presentation system illustrated in FIG. 1 and therein generally designated 10. The representative presentation system 10 has three cathode ray tube displays 12, 14 and 16 in juxtaposition. The correlated video signals to be simultaneously reproduced by these three displays are supplied from three optical video disk players 18, 20 and 22. These disk players are shown together with prerecorded video disks 24, 26 and 28 replaceably loaded therein.

Figures 2, 3:
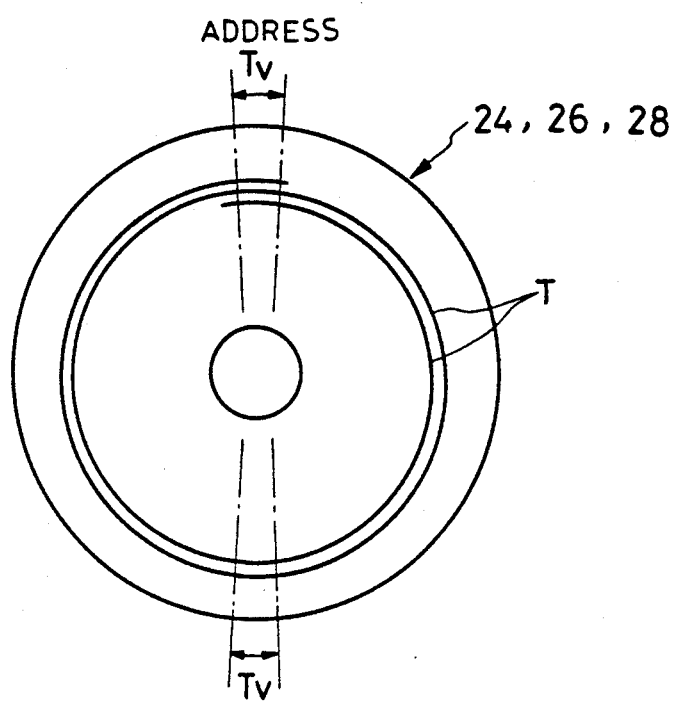
FIG. 2 is a plan view diagrammatically showing each video disk used in the presentation system.
FIG. 3 is a table explanatory of an example of presentation program that may be employed with the presentation system.

As pictured in FIG. 2, each of the video disks 24, 26 and 28 bears on its surface a multiplicity of tracks or storage locations T in the form of a multiturn spiral. The spiral tracks T have a video signal of the National Television System Committee format recorded thereon at a frame repetition rate of one per track. The recording tracks T have vertical retrace zones Tv at 180 degree intervals where track addresses are recorded in accordance with the prior art. The track addresses are coded data individually identifying the tracks T. Therefore, although all the turns of the spiral track T are shown to be continuous in this particular embodiment, such turns may be considered to represent the individual tracks. Indeed, instead of the multiturn spiral tracks T, a multiplicity of annular tracks may be formed concentrically on the surface of each video disk.

Per se well known in the art, the video disk players 18, 20 and 22 have each an optical pickup assembly, not shown, for tracing the tracks T on each video disk. The prerecorded picture information, as well as the track addresses, on the video disk is optoelectronically translated into an equivalent electric signal as the unshown pickup assembly scans the successive tracks T.

Typically, the video signal on the first video disk 24 represents continuous motion pictures, recorded sequentially on its successive tracks T. The video signals on the second 26 and third 28 video disks represent pictorial or verbal matter, or both, that is related to the continuous motion pictures on the first disk 24. The pictorial or verbal matter on the second 26 and third 28 video disks may be partly still and partly in motion. As is quite conventional in the art, still pictures are reproduced from video disks by repetitively scanning the same track with the reading beam. If the tracks are in the form of a multiturn spiral as shown in FIG. 2, the reading beam may be returned to the starting point of the same turn by oscillating a mirror conventionally included in the optical pickup assembly of the disk player.

With reference back to FIG. 1 the three video disk players 18, 20 and 22 are connected respectively to the displays 12, 14 and 16. Although the first disk player 18 is connected directly to the first display 12, which is disposed centrally of the three displays 12, 14 and 16, the second 20 and third 22 disk players are connected to the second 14 and third 16 displays via respective memories 30 and 32. Therefore, the video signals retrieved from the disks 26 and 28 by the second 20 and third 22 disk players are first written on the memories 30 and 32 and subsequently read out therefrom for reproduction on the second 14 and third 16 displays.

The memories 30 and 32 can be of conventional design capable of storing digital video signals from optical video disks. However, it must be taken into consideration that video disk players standard make put out analog video signals, and cathode ray tube displays of standard make accept only analog video signals. We therefore understand that the memories 30 and 32 have each an analog to digital converter on its input stage and a digital to analog converter on its output stage. Such memories are commercially available as "frame memories".

The first video disk player 18 is connected not only to the first display 12 but also to an address detector circuit 34. This circuit 34 is intended to derive the track address data from the output from the first video disk player 18, for delivery to a programmable system controller 36 included in the multiple display presentation system 10.

In practice the programmable system controller 36 can take the form of a microcomputer comprising a central processor unit 38 and a memory 40. The system controller 36 is connected to all of the video disk players 18, 20 and 22, and the memories 30 and 32 for controlling their operations in accordance with a predefined, and redefinable, presentation program, as will be detailed subsequently. We understand that the system controller 40 also includes a master synchronizer, not shown, for timing the operations of the three disk players 18, 20 and 22.

Preferably, the first video disk 24 has an aural signal prerecorded thereon along with the video signal. The aural signal represents, for example, a narrative concerning the visual information on the first video disk 24 and, where appropriate, on the other disks 26 and 28. For the reproduction of this aural signal, the first disk player 18 is connected to a loudspeaker 42 or a system of loudspeakers. The loudspeaker 42 is shown disposed on one side of the row of displays 12, 14 and 16.

Operation

We will describe the operation of the multiple display presentation system 10 with reference to FIG. 3. This figure shows in tabular form how the recordings on the three video disks 24, 26 and 28 are reproduced on the displays 12, 14 and 16 in accordance with an example of presentation program that has been introduced into the system controller 40. The table represents, however, only the first three scenes of the presentation as we believe that they suffice for the full disclosure of the system operation.

First of all, in Scene I, the first video disk player 18 scans the first disk 24 from Address 1 to Address 200 for the reproduction of the prerecorded continuous motion video signal. During this continuous motion picture reproduction from Addresses 1-200 on the first disk 26, the system controller 36 is programmed to synchronize the second video disk player 20 to scan only Address 200 on the second disk 26, and the third video disk player 22 to scan only Address 100 on the third disk 28, for the reproduction of the still images prerecorded on these tracks.

The prerecorded video signal on the first video disk 24 will be translated into an equivalent electric signal in the order of the successive tracks when the first video disk is conventionally scanned in the first player 18. The address detector circuit 34 will derive the track addresses from the output from the first video disk player 18 and deliver them to the system controller 36. Therefore, during the progress of the continuous picture reproduction from the first video disk 24, the system controller 36 knows at every instant the current track from which the picture is being reproduced.

The continuous motion picture signal retrieved from Addresses 1-200 on the first disk 24 will be fed directly into the first display 12 thereby to be visually reproduced. The still picture signals retrieved Address 200 on the second video disk 26 and from Addresses 100 on the third video disk 28 will be written on the respective memories 30 and 32. Repetitively read out from these memories, the still pictures will be visually reproduced on the second 14 and third 16 displays as the first display 12 reproduces the continuous motion pictures from Addresses 1-200 on the first video disk 24. We understand that the still images on the second 14 and third 16 displays are related to the continuous motion images on the first display 12.

Let us suppose by way of example that the multiple display presentation program now under consideration is the introduction of a corporation to prospective customers, buyers, investors, or would-be employees. Then, in Scene I, the first display 12 may exhibit the introductory portion of the corporate presentation in continuous motion, whereas the second 14 and third 16 displays may exhibit literal images in still form. Also, a narrative concerning the corporation may be audibly reproduced by the loudspeaker 42.

Incidentally, on several tracks before Address 200 on the second video disk 26, there may be prerecorded different still pictures that represent alternatives to that on Address 200. Any of these alternative still pictures may be chosen as desired and reproduced instead of the still picture on Address 200. Similarly, a set of alternative still pictures may be prerecorded on tracks before Address 100 on the third video disk 28 for selective reproduction instead of the still picture on Address 100. All that is required for such selective reproduction of alternative pictures is to modify the program on the system controller 40. No rerecording of the disks is necessary.

Then, in Scene II of the corporate presentation program now under consideration, the first disk player 18 will proceed to the successive scanning of Addresses 201-500 on the first disk 24. As has been mentioned, the system controller 36 is constantly informed by the address detector circuit 34 of the current track address being scanned by the first disk player 18. Therefore, when the first disk player 18 starts scanning Addresses 201-500 on the first disk 24, the system controller 36 will cause the second disk player 20 to start scanning Addresses 201-500 on the second disk 26, and the third disk player 22 to start scanning Addresses 101-400 on the third disk 28.

It is understood that the second 26 and third 28 video disks have continuous motion pictures rerecorded on their Addresses 201-500 and Addresses 101-400. Accordingly, all the displays 12, 14 and 16 will reproduce the continuous motion pictures from the video disks 24, 26 and 28. Scene II of the corporate presentation program may be the panoramic view of the whole premises of the corporation, with the three displays showing the different portions of the panorama.

Scene III will start when the first disk player 18 begins to scan Addresses 501-800 on the first disk 24 for the reproduction on the first display 12 of continuous motion images prerecorded on these tracks. Thereupon, in accordance with the corporate presentation program, the system controller 36 will cause the second disk player 20 to scan Address 200 on the second disk 26 again, and the third disk player 22 to scan Address 500 on the third disk 28. The still pictures retrieved from these addresses on the second 26 and third 28 disks will be written on the respective memories 30 and 32 and repeatedly read out therefrom for reproduction on the second 14 and third 16 displays.

An example of Scene III is a series of continuous motion images depicting the history of the corporation on the first display 12. The second 14 and third 16 displays may exhibit literal representations of the history in still form.

Figure 4:
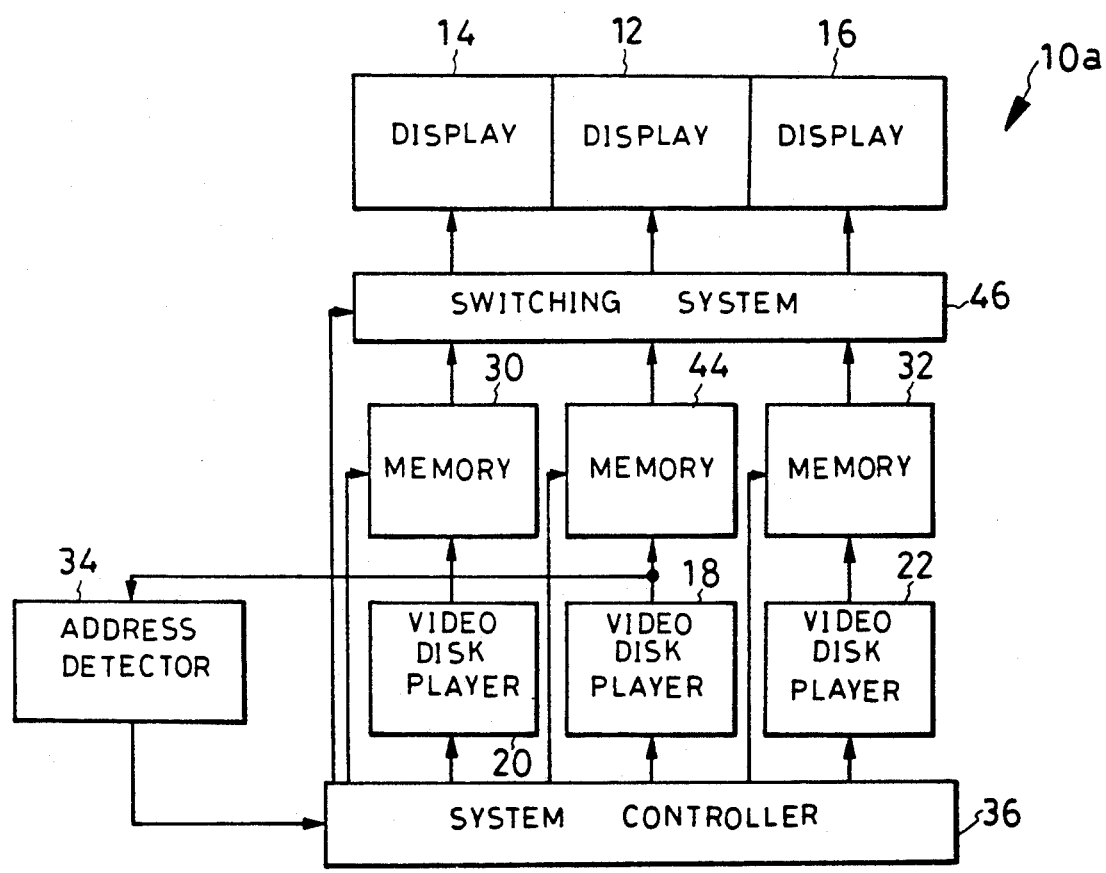
FIG. 4 is a block diagram of an alternative presentation system constructed in accordance with our invention.

In FIG. 4 we have shown an alternate form of visual presentation system according to our invention. The modified presentation system 10a features the provision of an additional memory 44 on the output side of the first video disk player 18 for storing the continuous motion images therefrom. The system controller 36 is connected to this additional memory 44, too, for controlling the readout of the continuous motion images therefrom.

Further, in this presentation system 10a, a switching system 46 is connected between the memories 20, 22 and 44 and the displays 12, 14 and 16. The switching system 46 includes electronic switches which can be actuated from the system controller 36 for connecting any of the memories 30, 32 and 44 to any of the displays 12, 14 and 16. A variety of different presentation methods are therefore possible on the three displays. The presentation system 10a is analogous in the other details of construction and operation with the FIG. 1 presentation system 10.

Having thus described the visual presentation system of our invention in its currently preferred forms, we will proceed to the evaluation of the advantages gained by the exemplified triple display systems 10 and 10a over the prior art.

1. Picture reproduction from the three video disks 24, 26 and 28 by the respective disk players 18, 20 and 22 are controllable track by track by the system controller 36 in coaction with the address detector circuit 34. Accordingly, the video signals need not be recorded on the disks in proper time relationship with one another and so are recordable far more easily than according to the prior art.

2. Sets of several alternative pictures, all related to the continuous motion pictures on the first disk 24, can be prerecorded on each of the second 26 and third 28 disks. Such alternative pictures may be selectively reproduced in desired combinations with those on the first disk 24. In other words, changes in scenario are possible by simple alterations of the presentation program introduced into the system controller 36.

3. The pictures signals that have been written on the memories 30 and 32, or on the memories 30, 32 and 44, can be read out therefrom for reproduction on the displays 14 and 16, or on the displays 12, 14 and 16, during the track seeking operations of the disk players 18, 20 and 22. No discontinuity is therefore to take place in picture reproduction on the displays.

4. Each of the video disk players 18, 20 and 22 is connectable to any of the displays 12, 14 and 16 by the switching system 46 for a greater variety of presentation.

Notwithstanding the foregoing detailed disclosure, we do not wish our invention to be limited by the exact details of the illustrated embodiment. Basically, we envisage the use of but one display for sequential reproduction of the pictures retrieved from two or more video disks in accordance with the principles of our invention. A variety of other modifications and alterations of the illustrated embodiments will suggest themselves to one skilled in the art without departing from the fair meaning or proper scope of the following claims.

What we claim is:

1. A visual presentation system comprising:
(a) a first video disk player for use with a first replaceable video disk having a multiplicity of tracks where pictures are prerecorded along with addresses identifying the tracks, the first video disk player having first means for retrieving the pictures and addresses from the successive tracks on the first video disk;
(b) a second video disk player for use with a second replaceable video disk having a multiplicity of tracks, similar to those on the first video disk, where pictures correlated with those on the first video disk are prerecorded, and having second means for retrieving pictures from said second disk;

(c) an address detector circuit for concurrently deriving from the output from the first video disk player the addresses of the successive tracks on the first video disk from which the pictures are being retrieved by the first video disk player;

(d) a system controller connected between the address detector circuit and the second video disk player for ascertaining from the derived addresses the successive tracks on the first video disk from which the pictures are retrieved by said first retrieving means, and for causing said second retrieving means to retrieve said correlated pictures from the second video disk in response to the retrieval of pictures from the first video disk; and (e) display means for concurrently visually reproducing the respective pictures retrieved from the first and the second video disks.

2. A visual presentation system comprising:

(a) a first video disk player for use with a first replaceable video disk having a multiplicity of tracks where pictures are prerecorded along with addresses identifying the tracks, the first video disk player having first means for retrieving the pictures and addresses from the successive tracks on the first video disk;

(b) a second video disk player for use with a second replaceable video disk having a multiplicity of tracks, similar to those on the first video disk, where pictures correlated to those on said first disk are prerecorded, and having second means for retrieving pictures from said second disk;

(c) an address detector circuit for deriving from the output from the first video disk player the addresses of the successive tracks on the first video disk from which the pictures are being retrieved by the first video disk player;

(d) a system controller connected between the address detector circuit and the second video disk player for ascertaining from the derived addresses the successive tracks on the first video disk from which the pictures are retrieved by the first retrieving means, and for causing the second retrieving means to retrieve said correlated pictures from the second video disk in response to the retrieval of pictures from the first video disk;

(e) a first display device connected to the first video disk player for visually reproducing the pictures retrieved from the first video disk; and (f) a second display device connected to the second video disk player for visually reproducing said correlated pictures retrieved from the second video disk in time correlation with those reproduced on the first display device.

3. The visual presentation system of claim 2 further comprising a memory connected between the second video disk player and the second display device for storing the pictures retrieved from the second video disk and for delivering the pictures to the second display device.

4. The visual presentation system of claim 3 wherein the system controller is connected to the memory for controllably reading out the pictures therefrom for reproduction on the second display device.

5. A visual presentation system comprising:

(a) a first video disk player for use with a first replaceable video disk having a multiplicity of tracks where pictures are prerecorded along with addresses identifying the tracks, the first video disk player having first means for retrieving the pictures and addresses from the successive tracks on the first video disk;

(b) a second and a third video disk player for use with a second and a third replaceable video disk each having a multiplicity of tracks, similar to those on the first video disk, where pictures correlated to these on said first disk are prerecorded, and having second and third means for retrieving pictures from said second and third disks;

(c) an address detector circuit for deriving from the output from the first video disk player the addresses of the successive tracks on the first video disk from which the pictures being retrieved by the first video disk player;

(d) a system controller connected to the address detector circuit for ascertaining from the derived addresses the successive tracks on the first video disk from which the pictures are being retrieved by said first retrieving means, the system controller being also connected to the second and the third retrieving means for causing the same to retrieve said correlated pictures from the second and the third video disks in response to the retrieval of pictures from the first video disk;

(e) a first display device connected to the first video disk player for visually reproducing the pictures retrieved from the first video disk; and (f) a second and a third display device connected to the second and the third video disk players, respectively, for visually reproducing said correlated pictures retrieved from the second and the third video disks in time correlation with those reproduced on the first display device.

6. The visual presentation system of claim 5 further comprising:

(a) a first memory connected between the second video disk player and the second display device for storing the pictures retrieved from the second video disk; and (b) a second memory connected between the third video disk player and the third display device for storing the pictures retrieved from the third video disk;

(c) the system controller being connected to the first and the second memories for controllably reading out the stored pictures therefrom for reproduction on the second and the third display devices.

7. A visual presentation system comprising:

(a) a first video disk player for use with a first replaceable video disk having a multiplicity of tracks where pictures are prerecorded along with addresses identifying the tracks, the first video disk player having a first means for sequentially retrieving the pictures and addresses from the successive tracks on the first video disk;

(b) a second and a third video disk player for use with a second and third replaceable video disk each having a multiplicity of tracks, similar to those on the first video disk, where pictures correlated to those on said first disk are prerecorded, and having second and third means for retrieving pictures from said second and third disks;

(c) a first, a second and a third display device for visually reproducing the pictures retrieved from the first, the second and the third video disks by the first, the second and the third video disk players;

(d) a first, a second and a third memory connected between the first, the second and the third video disk players and the first, the second and the third display devices for storing the pictures from the first, the second and the third video disk players and for delivering the stored pictures to the first, the second and the third display devices;

(e) an address detector circuit for deriving from the output from the first video disk player the addresses of the successive tracks on the first video disk from which the pictures are being retrieved by the first video disk player; and (f) a programmable system controller connected to all of the first, the second and the third video disk players and the first, the second and the third memories for causing correlated pictures from the first, the second and the third video disks to be reproduced on the first, the second and the third display devices in accordance with a predefined program, the system controller being also connected to the address detector circuit for ascertaining from the derived addresses the successive tracks on the first video disk from which the pictures are being retrieved by said first retrieving means and for causing said second and third retrieving means to retrieve said correlated pictures from prescribed tracks on the second and the third video disks in response to the retrieval of pictures from the ascertained tracks on the first video disk.

8. The visual presentation system of claim 7 further comprising a switching system for connecting each of the first and the second and the third video disk players to any of the first and the second and the third display devices via one of the first and the second and the third memories.

* * * * *